US012595185B2

(12) United States Patent
Arantes Araújo

(10) Patent No.: US 12,595,185 B2
(45) Date of Patent: Apr. 7, 2026

(54) PROCESS FOR RECOVERING MATERIALS FROM BAUXITE RESIDUE, MICROWAVE REACTOR FOR HEATING MINING PRODUCTS AND METHOD FOR HEATING A MINING PRODUCT

(71) Applicant: NEW WAVE ROYALTIES SOCIEDAD ANONIMA, Montevideo (UY)

(72) Inventor: Lucas Arantes Araújo, Rio de Janeiro (BR)

(73) Assignee: NEW WAVE ROYALTIES SOCIEDAD ANONIMA, Montevideo (UY)

( * ) Notice: Subject to any disclaimer, the term of this patent is extended or adjusted under 35 U.S.C. 154(b) by 395 days.

(21) Appl. No.: 18/256,766

(22) PCT Filed: Dec. 17, 2021

(86) PCT No.: PCT/BR2021/050556
§ 371 (c)(1),
(2) Date: Jun. 9, 2023

(87) PCT Pub. No.: WO2022/126217
PCT Pub. Date: Jun. 23, 2022

(65) Prior Publication Data
US 2023/0382755 A1    Nov. 30, 2023

(30) Foreign Application Priority Data
Dec. 18, 2020    (BR) ...................... 10 2020 026102 9

(51) Int. Cl.
*C01F 7/441*        (2022.01)
*B03B 9/04*        (2006.01)
(Continued)

(52) U.S. Cl.
CPC ................ *C01F 7/441* (2013.01); *B03B 9/04* (2013.01); *B03C 1/30* (2013.01); *C01B 33/126* (2013.01);
(Continued)

(58) Field of Classification Search
None
See application file for complete search history.

(56) References Cited

U.S. PATENT DOCUMENTS 3,295,924 A  *  1/1967  Colombo .................. C01F 7/08
                                                              423/113
4,311,520 A     1/1982  Kruesi et al.
(Continued)

FOREIGN PATENT DOCUMENTS

CN        108998610        12/2018
CN        109576487 A  *  4/2019    ......... C21B 13/0066
(Continued)

OTHER PUBLICATIONS

English translation of CN-109576487-A Description. (Year: 2019).*
(Continued)

*Primary Examiner* — Daniel Berns
*Assistant Examiner* — Zachary John Baum
(74) *Attorney, Agent, or Firm* — Alston & Bird LLP

(57) ABSTRACT

This invention refers to a technically and economically viable process for recovery of relevant metallic and non-metallic contents from mining residues, particularly the bauxite residue, using it in its integral form. Such a process route uses energy from microwaves, assisted leaching and logic sequencing of steps that allow a technically and economically viable removal of components from the bauxite residue, particularly the residue from the Bayer process. The invention also refers to a microwave reactor that is
(Continued)

appropriate for performing the above-mentioned process, as well as to a method for heating a mining product.

2 Claims, 6 Drawing Sheets

(51) Int. Cl.

| | |
|---|---|
| *B03C 1/30* | (2006.01) |
| *C01B 33/12* | (2006.01) |
| *C01G 23/053* | (2006.01) |
| *C22B 1/02* | (2006.01) |
| *C22B 1/24* | (2006.01) |
| *C22B 3/08* | (2006.01) |
| *C22B 3/22* | (2006.01) |
| *C22B 34/12* | (2006.01) |
| *F27D 1/00* | (2006.01) |
| *F27D 11/12* | (2006.01) |
| *H05B 6/64* | (2006.01) |

(52) U.S. Cl.
CPC ............ *C01G 23/0534* (2013.01); *C22B 1/02* (2013.01); *C22B 1/2406* (2013.01); *C22B 3/08* (2013.01); *C22B 3/22* (2013.01); *C22B 34/1213* (2013.01); *C22B 34/1259* (2013.01); *F27D 1/0003* (2013.01); *F27D 11/12* (2013.01); *H05B 6/6491* (2013.01); *B03C 2201/20* (2013.01)

(56) References Cited

U.S. PATENT DOCUMENTS

| | | | |
|---|---|---|---|
| 6,277,168 | B1 | 8/2001 | Huang et al. |
| 8,034,320 | B2 | 10/2011 | Rundel |

FOREIGN PATENT DOCUMENTS

| | | |
|---|---|---|
| JP | 2017-090030 A | 5/2017 |
| WO | WO-2004/068902 A2 | 8/2004 |
| WO | WO 2009/063482 | 5/2009 |

OTHER PUBLICATIONS

Li, G., et al. Stepwise extraction of valuable components from red mud based on reductive roasting with sodium salts. Journal of Hazardous Materials 280 (2014) 774-780. (Year: 2014).*

Samouhos, M., et al. Greek "red mud" residue: A study of microwave reductive roasting followed by magnetic separation for a metallic iron recovery process. Journal of Hazardous Materials 254-255 (2013) 193-205. (Year: 2013).*

International Search Report and Written Opinion for International Application No. PCT/BR2021/050556, dated Aug. 19, 2022, (17 pages), European Patent Office, Rijswijk, Netherlands.

Written Opinion of the International Preliminary Examining Authority for International Application No. PCT/BR2021/050556, dated Feb. 13, 2023, (5 pages), European Patent Office, Rijswijk, Netherlands.

International Preliminary Report on Patentability for International Application No. PCT/BR2021/050556, dated Mar. 29, 2023, (5 pages), European Patent Office, Rijswijk, Netherlands.

Agrawal, Shrey et al. "Investigation of Carbothermicmicrowave Reduction Followed by Acid Leaching for Recovery of Iron and Aluminum Values From Indian Red Mud," *Minerals Engineering,* vol. 159:106653, Sep. 24, 2020, pp. 1-13, DOI: 10.1016/j.mineng. 2020.106653.

Mishra, Brajendra et al. Materials Sustainability for Environment: Red-Mud Treatment, *Frontiers of Chemical Science and Engineering,* vol. 11, No. 3, pp. 483-496, Jun. 14, 2017, DOI: 10.1007/s11705-017-1653-z.

Rai, Suchita et al. Recovery of Iron From Bauxite Residue Using Advanced Separation Techniques, *Minerals Engineering,* vol. 134, pp. 222-231, Apr. 2019, DOI: 10.1016/j.mineng.2019.02.018.

Brazilian Office Action for Application No. BR102020026102-9, dated Nov. 3, 2021, 40 pages, Brazilian National Institute of Industrial Property.

Office Action Response and Amended Claims submitted on Feb. 14, 2022, for Brazilian Application No. BR102020026102-9, filed in response to Office Action dated Nov. 3, 2021, (114 pages).

Allowance Report for Brazilian Application No. BR102020026102-9, dated May 1, 2022, (25 pages), Brazilian National Institute of Industrial Property.

Cardenia, et al., "Optimization of Microwave Reductive Roasting Process of Bauxite Residue", *Metals,* vol. 10, No. 1083, (17 pages), Aug. 11, 2020, doi:10.3390/met10081083.

Ofori-Sarpong, et al., "Bauxite Enrichment by Microwave-magnetising Roasting using Sawdust as Reducing Agent", *American Journal of Chemical Engineering,* vol. 2, No. 5, pp. 59-64, Sep. 10, 2014, doi : 10.11648/j.ajche.20140205.11.

Reid, et al., "Technospheric Mining of Rare Earth Elements from Bauxite Residue (Red Mud): Process Optimization, Kinetic Investigation, and Microwave Pretreatment", www.nature.com/scientificreports/, vol. 7, Nov. 10, 2017, DOI: 10.1038/s41598-017-15457-8.

Lu, et al., "Carbothermal Reductive Upgrading of a Bauxite Ore Using Microwave Radiation", *High Temp. Mater. Proc.,* vol. 31, pp. 139-148, (2012), DOI 10.1515/htmp-2012-0002.

* cited by examiner

PROCESS FOR RECOVERING MATERIALS FROM BAUXITE RESIDUE, MICROWAVE REACTOR FOR HEATING MINING PRODUCTS AND METHOD FOR HEATING A MINING PRODUCT

CROSS REFERENCE TO RELATED APPLICATIONS

This application is a National Stage Application, filed under 35 U.S.C. § 371, of International Application No. PCT/BR2021/050556, filed Jun. 7, 2023, which international application claims priority to and the benefit of Brazil Application No. 10 2020 026102 9, filed Dec. 18, 2020; the contents of both of which are hereby incorporated by reference in their entirety.

BACKGROUND

Technical Field

This invention refers to a technically and economically feasible recovery process of relevant metals and non-metals of mining residues, particularly the bauxite residue, by using it in its whole. Such process route uses microwave energy, assisted leaching and logic sequencing of steps to allow a technically and economically feasible removal of components from the bauxite residue, particularly the one derived from the Bayer process. Using electromagnetic radiation within the spectrum of microwaves leads to an improved efficiency in the treatment and processing of these materials and residues. This invention also provides a microwave reactor, whose construction and operation are particularly efficient for application in the recovery of mining residues, and more particularly the bauxite residue resulting from the Bayer process. Further, this invention refers to a microwave reactor for heating mining products, that is specifically adapted for heating mining products to the recovery of materials of interest, being applicable to perform a recovery process of materials derived of the aforesaid bauxite residue.

Description of Related Art

In the technological field of mining process-derived products, one of the famous processes, mostly used by the mining industry to extract aluminum from iron ore (bauxite) is the Bayer process.

The Bayer process, developed in 1888, is the most used worldwide to alumina production. This process consists in promotion a digestion of bauxite under temperature and pressure by using sodium hydroxide as leaching agent. The digestion stage enables the aluminum contained in the bauxite in the form of gibbsite, boehmite and diaspore to reach with the sodium hydroxide, thus forming the soluble compound sodium aluminate. So, it is possible to separate this liquor containing sodium aluminate from the Bayer process residue, both by thickening and decantation. The liquor is forwarded to a crystallization step for alumina recovery; the material resulting from decanters are tailings the Bayer process, that are deposited in disposal lagoons.

This residue from the Bayer process (known as bauxite residue, or red mud) is primarily composed of iron contents in the form of hematite and goethite, aluminum in the form of gibbsite and Bayer sodalite, titanium in the form of anatasium and other minor elements, such as scandium, uranium, thorium, and zircon, among others. This tailing from Bayer process is insoluble at the digestion step, and results from the precipitation of kaolinite in the form of Bayer Sodalite. This sodalite contains aluminum, as well as iron, sodium and hydroxide. This tailing also contains a range of metals of strategic interest to the industry, such as zircon, scandium and titanium.

Nevertheless, the bauxite residue generated from alumina processing by Bayer is highly pollutant: it is reactive and corrosive due to its high pH; contains heavy metals, particularly uranium and thorium; it is fine and light, thus requiring constant monitoring; irrigated and compact; requires soil waterproofing to avoid contamination. Therefore, such bauxite residue implies high maintenance costs, being highly harmful to be environment and likely to cause environmental catastrophes, such as the disaster at Ajka plant, in Hungary.

In view of the above, the state of art intends to provide solutions to the treatment of products and residues for further obtaining materials of interest, including bauxite residue processing. However, such processes currently known lack efficiency in eliminating the residue, being limited to what is possibly extracted as material of interest, as explained below.

Conceptually, solutions to the treatment of mining products and to the recovery of materials of interest mostly comprise converting or processing products or residue for subsequent separation through other procedures (such as magnetic separation or leaching), thus allowing the extraction of elements of interest from that product or residue.

The conversion of products or residues traditionally uses the application of heat to force the change of phases of elements present therein and to allow their separation and use. Such heat results from the coal burning, also usually employed as reducing agent in conversion processes. The above comments disclose a first concern of the state of art: a conversion through heat generated by pollutant sources such as coal, whose burning produces $CO_2$ that is knowingly harmful to the environment.

The state of art proposes solutions based on the use of microwaves for energy supply, with a consequent heating of products and residues. So, the need of coal burning to the generation of heat as required to the conversion could be theoretically eliminated, as only the reductor would be used in the conversion and reduction; in this case, one should possibly operate close to the stoichiometry.

Examples from prior art documents that disclose the use of microwaves to heat mining products shall be assessed below.

The American patent document U.S. Pat. No. 6,277,168 suggests the use of a microwave chamber to the conversion and fusion of an ore, for further obtaining molten metal in the chamber bottom. Nevertheless, U.S. Pat. No. 6,277,168 neither teaches nor mentions proceedings to the recovery of mining products derivates or residues of interest, thus showing that its application is limited to directly converting ore and subsequently obtaining molten metal, without any possibility of selecting specific elements from the treated product for separation. Therefore, the system disclosed by U.S. Pat. No. 6,277,168 is not feasible for treating residues such as bauxite ones, as such materials are not appropriate for obtaining metal alloys only through the conversion step.

Another example consists in the American patent document U.S. Pat. No. 8,034,320, that provides the use of microwaves for converting magnetic iron pellets (magnetite) into hematite. Of note, U.S. Pat. No. 8,034,320 neither teaches nor mentions a possible recovery of materials of interest through the treatment/processing of the base product; as a matter of fact, as it suggests transforming magnetite into hematite, the document U.S. Pat. No. 8,034,320 rules out any possible selection of derivates of interest, because it raises difficulties to the iron processing through magnetic separators.

Another example is the American patent document U.S. Pat. No. 4,311,520, that discloses a process for recovery of nickel, cobalt and manganese from their oxides and silicates, including lateritic nickel. However, the document U.S. Pat. No. 4,311,520 only teaches the use of microwaves to the reduction of base products to allow the subsequent extraction of the materials, instead of using ovens or chemical procedures, to tentatively reduce the energy and resources spent with the reduction. Nevertheless, given the very low content of elements of interest in some kinds of products encompassed by U.S. Pat. No. 4,311,520 (for instance, the lateritic zone of nickel deposits), the use of microwaves for reduction is not sufficient to make the procedure advantageous under an economic point of view.

In addition to the aforesaid documents, academic efforts have been constantly made to determine possible solutions to treat bauxite residue from the Bayer process. For instance, one may refer to the scientific paper *"Investigation of carbother micmicrowave reduction followed by acid leaching for recovery of iron and aluminum values from Indian red mud"*, by S. Agrawal and N. Dhawan, that experimentally suggests a carbothermal reduction of bauxite residue by using microwaves and a subsequent leaching of this reduced residue for extraction of iron and aluminum. Other academic publications disclose similar contents, thus suggesting a pyrometallurgical process of residue reduction through microwaves, followed by chemical treatment for extraction of iron and aluminum, and, in certain cases, rare earth.

Nevertheless, as it is widely known, the residue resulting from bauxite processing (particularly Bayer process residues) contains several other materials of interest other than iron and alumina. One could mention, for instance, the titanium dioxide, another material of industrial interest contained from the residue from Bayer process, that both patent and academic publications fail to cover. However, the state of art is unable to anticipate a complete extraction process of these other components of interest, so that the recovery processes known so far present low efficiency and result into very high levels of what is deemed to be a tailing from the process. So, the state of art is unable to completely solve one of the major concerns relating to the bauxite residue, namely the high volume of tailings generated by bauxite treatment, particularly through the Bayer process.

Moreover, said academic publications are, by their own nature, mere conjectures, and do not suggest any concrete process comprising logic and sequential steps that effectively allow an efficient extraction of multiple materials of interest from the bauxite residue. This is particularly remarkable within the scope of bauxite residues derived of the Bayer process, wherein the residue management for extraction of a single product of interest impacts the potential extraction of all the other products contained in the residue. So far, it is not possible to identify in the state of art a suitable and complete process to an efficient recovery of bauxite residues, including recovery of multiple materials of interest other than iron and alumina.

Additionally, the state of art is unable to suggest a microwave reactor equipment specifically designed to be used in the recovery of bauxite residue, that is highly efficient in this application. Although the state of art contemplates the use of microwaves for the treatment of residues, such microwaves present a generic, experimental or laboratorial use, being unable to reach a suitable efficiency to this kind of desired application for recovery of bauxite residues.

BRIEF SUMMARY

Considering the aforesaid concerns from the state of art, a first objective of this invention is to provide an efficient recovery process of derivatives from bauxite residue, particularly the chemical residue resulting from alumina production through the Bayer process.

A second objective of this invention is to provide a recovery process of derivatives from bauxite residue comprising a logic sequence of concrete steps that allow extracting multiple elements from the process, beyond the mere extraction of iron and alumina.

A third objective of this invention is to provide a recovery process of derivatives from bauxite residue that uses the advantages of the pyrometallurgical process for residue carbothermal conversion through microwaves, together with a logic and particular sequence of subsequent chemical processing steps to allow a particularly efficient extraction of elements of interest from the residue.

A fourth objective of this invention is to provide a microwave reactor for heating mining products that is particularly efficient to heat and convert mining residues, such as bauxite residue, and can be applied in the performance of the recovery process of derivatives from bauxite residue suggested herein.

This invention refers to a recovery process of derivatives from bauxite residue comprising the steps of mixing the bauxite residue to a reducing agent to obtain a residue mixture; heating the residue mixture in a microwave reactor to obtain a reduced bauxite residue; magnetically separating the reduced bauxite residue to obtain portions of magnetic and non-magnetic materials; leaching the portion of non-magnetic material to obtain a leaching liquor, and then decanting and filtering said leaching liquor for extraction of silica; precipitating the liquor byproduct of leaching to obtain titanium dioxide; evaporating the liquor byproduct of the precipitation to obtain a saturated liquor and an alumina-rich retained solid; and calcinating said alumina-rich retained solid obtained from evaporation to obtain alumina.

In a possible embodiment of the recovery process of derivatives from bauxite residue proposed herein, the reducing agent comprises a particle size less than 75 μm, the mixture takes place between 10 and 30 minutes up to the formation of a carbothermal mixture of bauxite residue and reductor, at ratios from 5 to 50% of reductor.

In another possible embodiment of the recovery process of derivatives from bauxite residue proposed herein, said process comprises a pelletizing step of the residue mixture obtained in the mixture step, prior to the heating step.

In another possible embodiment of the recovery process of derivatives from bauxite residue proposed herein, in the heating step, the bauxite residue is irradiated from 10 kW·h to 100 kW·h power per ton of carbothermal mixture for a period from 2 to 18 minutes, with a temperature kept in values above 80% of temperature for conversion to magnetic phases for, at least, twice the time spent to reach the temperature for conversion to magnetic phases.

In another possible embodiment of the recovery process of derivatives from bauxite residue proposed herein, said process comprises the steps of performing a first milling of the byproduct from the heating step; performing a separation per size of bauxite residue milled in the first milling to obtain a gross portion and a fine portion of residue; performing a magnetic separation in the gross portion of the residue to obtain gross magnetic and non-magnetic portions; performing a second milling in the fine portion of the residue; and performing a magnetic separation in the fine portion of the milled residue to obtain fine magnetic and non-magnetic portions.

In another possible embodiment of the recovery process of derivatives from bauxite residue proposed herein, the first separation by size comprises sending the bauxite residue resulting from the first milling to a first cyclonic separator, that separates the bauxite residue in portions of material with size less and more than #100; sending the portion of material less than #100, separated by the first cyclonic separator, to the second cyclonic separator; separating, though the second cyclonic separator, the portion of material less than #100 received in portions higher and lower than #200, being the portion lower than #200 a fine portion; and gathering the portion higher than 100, separated by the first cyclonic separator, to the portion higher than #20, separated by the second cyclonic separator to obtain a gross portion.

In another possible embodiment of the recovery process of derivatives from bauxite residue proposed herein, leaching takes place at a solid-liquid ratio of 1 to 10 grams of non-magnetic portion per 10 mL of sulfuric acid solution at concentrations ranging from 2 mol/L to 6 mol/L.

In another possible embodiment of the recovery process of derivatives from bauxite residue proposed herein, leaching takes place within a period from 30 to 120 minutes and a temperature from 30° to 90° C., with agitation speed from 400 to 600 RPM.

In another possible embodiment of the recovery process of derivatives from bauxite residue proposed herein, the precipitation comprises adding a $TiO_2$ seed to the liquor; and adjusting the pH of the solution containing sodium hydroxide up to a pH from 1.5 to 2.5 to precipitate the titanium dioxide.

In another possible embodiment of the recovery process of derivatives from bauxite residue proposed herein, the precipitation takes place at an agitation speed from 50 to 200 RPM, at a temperature from 10° to 90° C., and within a period from 30 to 120 minutes.

In another possible embodiment of the recovery process of derivatives from bauxite residue proposed herein, evaporation comprises evaporating the solution of aluminum sulfate-rich liquor up to a density from 10 to 16 degrees Baumé and adding stoichiometric amounts of sodium sulfate and adjusting the pH of the liquor between 6 and 12 with a solution of 50% sodium hydroxide.

In another possible embodiment of the recovery process of derivatives from bauxite residue proposed herein, calcination comprises calcinating the retained solid at temperatures ranging from 400° to 800° C., for a period from 30 to 120 minutes.

This invention also contemplates a microwave reactor for heating mining products, wherein the reactor comprises a housing composed by thermal insulation material transparent to microwaves; at least a susceptor wall composed by susceptor material; and at least a reflector plate composed by reflector material of electromagnetic waves, wherein the region limited by the housing and by, at least, a susceptor wall characterizes at least a heating chamber.

In a possible embodiment of the microwave reactor for heating mining products proposed herein, the material that forms the housing is a cell concrete with high alumina content.

In another possible embodiment of the microwave reactor for heating mining products proposed herein, the housing is formed by a cell concrete with 75% to 95% of Al2O3 in its composition.

In another possible embodiment of the microwave reactor for heating mining products proposed herein, the housing is composed by low-density cell concrete.

In another possible embodiment of the microwave reactor for heating mining products proposed herein, the housing is composed by cell concrete with density ranging from 0.7 to 1.2 gram per cubic centimeter.

In another possible embodiment of the microwave reactor for heating mining products proposed herein, the susceptor material of the susceptor wall is, at least, one of: silicon carbide, luminite and metallic titanium.

In another possible embodiment of the microwave reactor for heating mining products proposed herein, the reflector plate comprises, at least, a brushed surface turned towards the heating chamber.

This invention still contemplates a method to heat mining products, wherein such method comprises the step of issuing microwaves over a microwave reactor, so that they traverse a housing of the microwave reactor composed by thermal insulation material transparent to microwaves, and so that said microwaves reach, at least, a susceptor wall.

In a possible embodiment of the method to heat mining products proposed herein, said method comprises the step of reflecting the microwaves over a reflector plate.

In another possible embodiment of the method to heat mining products proposed herein, the step of issuing microwaves over a microwave reactor involves heating the material for 2 to 18 minutes to reach a temperature for conversion into magnetic phases and the maintenance of the temperature above 80% of the temperature for conversion into magnetic phases for, at least, twice the time spent to reach the temperature for conversion into magnetic phases.

BRIEF DESCRIPTION OF THE FIGURES

This invention shall be described in further details, based on an exemplary embodiment represented by the drawings.

The drawings show.

DETAILED DESCRIPTION OF VARIOUS EMBODIMENTS

Firstly, one should point out that the term "preferential" as used herein should not be understood as "mandatory" or "compulsory". The term "preferential" characterizes a particularly efficient embodiment of the invention among various possible embodiments, so that the scope of the invention is only limited by its characteristics that are effectively essential for obtaining the technical effects as proposed.

Moreover, the term "bauxite residue" as used in this specification should be understood as the residue generated by the bauxite ore processing, particularly through the Bayer process, whose composition comprises ore in the form of hematite and goethite, aluminum in the form of gibbsite and Bayer sodalite, titanium in the form of anatasium, scandium, uranium, thorium, and zircon, being likely to contain or additional elements or not.

Additionally, to better understand this invention, the term "mesh" as used herein (and corresponding to the symbol "#") intends to define intervals of a particle size. A person skilled in the art shall understand that the term "mesh", employed herein in relation to a single number, does not mean that each particle of the product or residue processed has exactly this size; instead, the indication of "mesh" size represents approximately the average size or mean of interval between particles within that category.

Recovery Process—Bauxite Residue

A first process contemplated by this invention is the recovery process of bauxite residue materials, particularly residues from the Bayer process.

Figures 2, 2A:
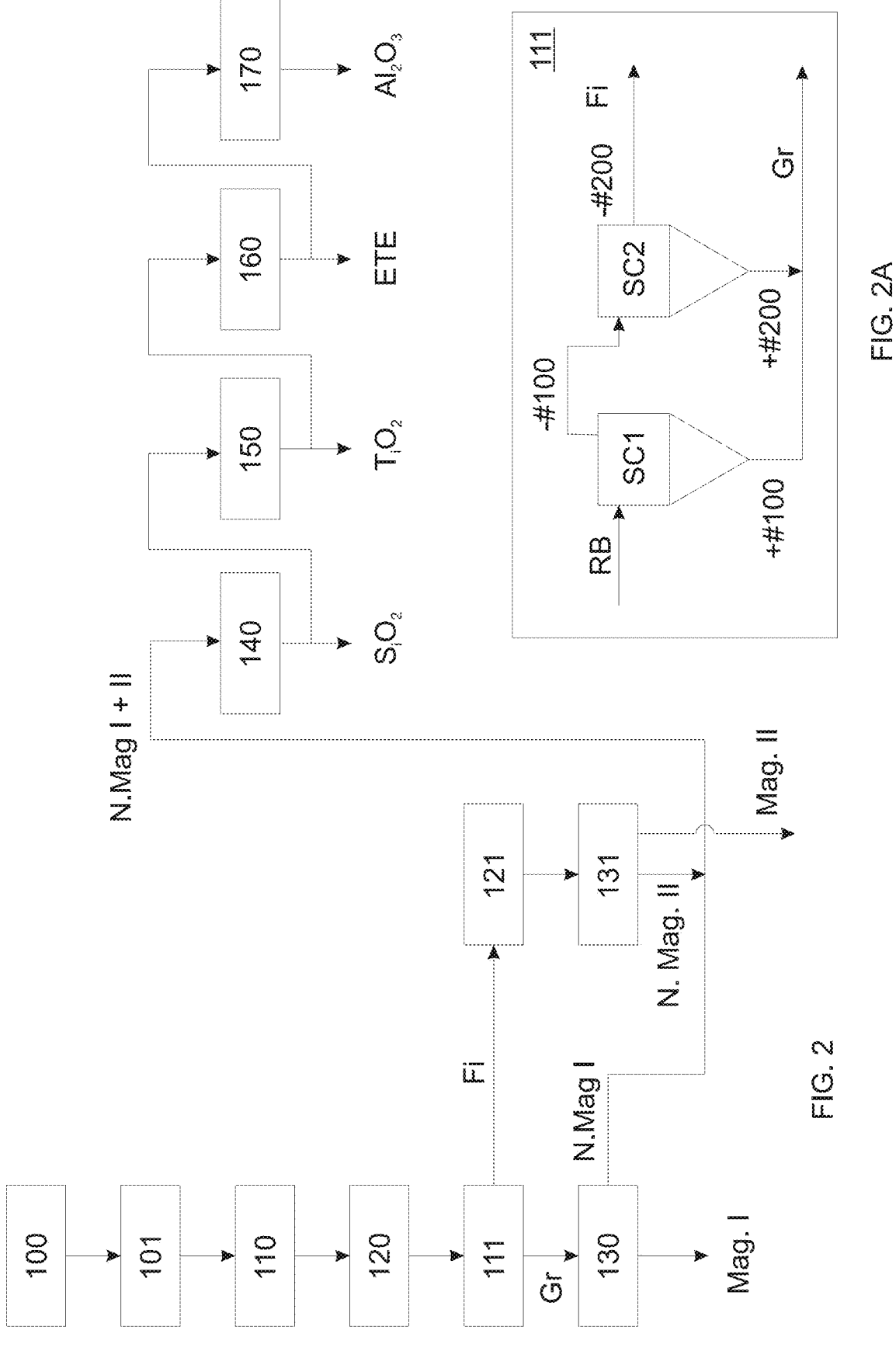
FIG. 2—is a flowchart of the recovery process of derivatives from bauxite residue, in a preferential embodiment.
FIG. 2A—is a flowchart of the separation process of fine and gross portions from bauxite residue, in a preferential embodiment of the recovery process.

So, this invention suggests an efficient recovery process of materials of interest from the bauxite residue, through a heating method using microwaves, whose preferential embodiment is illustrated in the FIG. 2.

The process of this invention preferably comprises the early pyrometallurgical steps of mixing 100 the bauxite residue to a reducing agent to obtain a residue mixture; pelletizing 101 the mixture obtained and heating 110 the residue mixture in a microwave reactor 1 to obtain a reduced bauxite residue.

Mixing Step (100)

The mixing step 100 is intended to add a reducing agent to allow the subsequent conversion/reduction of certain materials of interest inside the mining product by heating, thus obtaining the reduced bauxite residue as referred to herein. The reducing agent can be, for instance, the coke, but several other reduces can be used, such as fines of mineral and vegetable coal, lignin, sawdust among others, given the versatility of reduction through microwaves. Of note, the coke is exclusively used to allow conversion of materials present in the bauxite residue, and not to burn or heat the residue itself, given that such heating is performed by the microwaves. Therefore, the process proposed herein generates less greenhouse gases, being more efficient than the carbon-based industrial processes for iron reduction of the state of art.

Preferably, the reductor shall be previously milled below 75 μm, in case of a solid reductor, and mixed in a Ribbon Blender-type equipment from 10 to 30 minutes, preferably from 15 to 25 minutes, until forming a carbothermal mixture of bauxite residue and reductor at ratios from 5 to 50%, preferably from 10 to 20% of reductor, more preferably at the ratio of 11% reductor. The mixture of reductor and bauxite residue to form a carbothermal mixture is completely forwarded to the new unit operation, namely the pelletizing step 101.

Pelletizing Step (101)

The pelletizing step is optional, as it is possible to perform the metallurgic reduction step with the powder freely moving inside the microwave. Nonetheless, pelletizing is intended to agglomerate the fine particles, thus uniting them, which prevents gases from carrying them and facilitates the diffusion of reducing gases inside the pellet. This is the reason why the high diffusivity from pelletizing reduces the time required for reaction and produces a quicker conversion. If pelletizing 101 is performed, the parameters for tilt and rotation shall be the characteristics of the bauxite residue, such as moisture, sodium hydroxide content and composition. Preferential sodium contents range from 4 to 8%, preferably from 5 to 6%, so that no binder is required for this step, wherein the composition of pellet itself is enough for such purpose. The pellets from carbothermal mixture are completely forwarded to the next unit operation, namely the heating 110.

Heating Step (110)

In the heating step 110 performed by microwaves 110, the reaction takes place in a reactor powered by a 100 kW microwave generator, wherein 10 kW·h to 100 kW·h power per ton of carbothermal mixture is irradiated, preferably 20 kW·h to 60 kW·h per ton of carbothermal mixture. The microwave reactor used in the heating step 110 described above can be, for instance, the microwave reactor 1 as suggested by this invention for obtaining a particularly high efficiency in the heating. Said reactor 1 shall be further described. In this respect, the heating time can preferably very from 2 to 18 minutes, with a temperature being kept above 80% of the temperature of conversion into magnetic phases for, at least, twice the time spent to reach the temperature of conversion into magnetic phases, more preferably 4 minutes of irradiation, with heat kept for 10 minutes. For instance, the temperature of conversion into magnetic phases to be applied can range from 300° C. to 1000° C.

In this respect, the use of microwaves for heating mining products results into multiple advantages and positive effects to the process. Firstly, the microwave promotes a transfer of energy, not of heat; so, the heating and transformation of phases take place on a more efficient basis. Further, the electromagnetic waves from the microwave spectrum promote a change in the structure of the molecule; the rotation of electric and magnetic dipoles cause the mineral structure that traverses the microwave to leave the crystalline form, with advantages to the processing. Therefore, the pre-treatment of ore with microwaves allows a recovery of metals with less consumption of reagents.

Processing the tailing from Bayer process in a microwave gives rise to several advantages, when compared to a number of other forms of reduction and heating, such as blast furnace and rotating oven, among others. This happens because heating through electromagnetic waves, provided by the microwave equipment, transfers energy and not heat, so that heating takes place from inside to outside, on an atomic basis. The electromagnetic wave alters the status of atoms rotation, and makes them vibrate and rotate, thus increasing the average kinetic energy, and consequently the temperature. In addition, the process alters the atom structure of compounds contained in this residue, by transforming sodalite into nepheline, anatasium into amorphous or ruthyl, among others.

Such interaction with the electromagnetic wave takes place on an uneven basis in the materials contained inside the residue, and the di-electric constant, real and imaginary, is the property that governs the intensity of this interaction. Some materials, such as magnetite, present high di-electric constants, and shall consequently keep more interaction with the electromagnetic wave and shall dissipate more energy. In addition to reducing the iron phases, this uneven interaction shall promote a unique release of materials, thus facilitating the separation of these latter and improving reactivity.

For instance, titanium in the form of anatasium is a very inert material. After being irradiated by microwave, vibration makes it amorphous, and this leads the material to start reacting with mineral acids, thus allowing its solubilization and subsequent recovery, as seen below.

This is the origin of the beneficial effects produced by using a microwave reactor 1 for conversion and heating of mining products of interest. A quicker and more efficient heating is obtained, with the prior separation of materials by uneven vibration, and, not less relevant, without need of burning pollutant fuels such as carbon; by using a microwave reactor, it is possible to employ stoichiometric amounts of reductor. Additionally, such advantages can be observed, mutatis mutandis, for all the processes of this invention described herein, that use a microwave reactor to the reduction/conversion of mining products.

Figure 3:
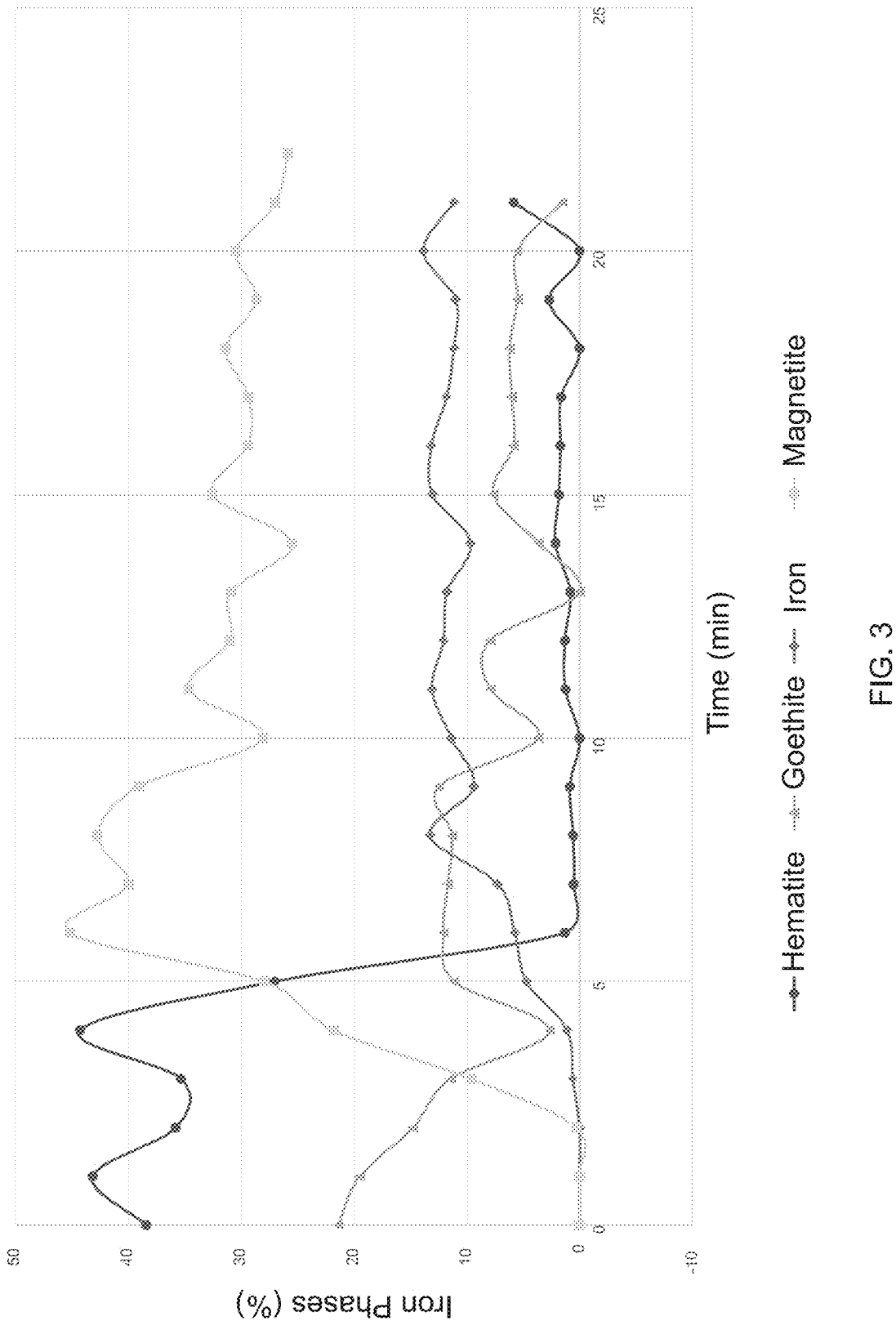
FIG. 3—is a graph showing the conversion of multiple phases of iron contained in the bauxite residue over time, during the recovery process of bauxite residue of this invention.

For the sake of clarity about what happens in the heating of a mining product during the process of this invention, one notes that hematite and goethite, phases present in the bauxite residue (time 0), are quickly converted by the microwave energy and by the CO present in the coke through a Bourdouard reaction. So, the magnetic phases of iron, metallic iron and magnetite start growing during the minutes, as better seen in the FIG. 3. Other materials contained in the residue, such as Sodalite, also undergo conversion. To better illustrate the conversion undergone by the residue, the Table 1 below shows the phases of bauxite residue during heating through microwave:

the reduced bauxite residue to be concentrated by magnetic separators. Milling 120, 121 can be performed, for instance, by a bar or ball mill, preferably by a ball mill.

Preferably, a first milling step 120 is performed to achieve a first disaggregation of the residue. Further details about the milling steps 120, 121, and particularly about the second milling step 121 shall still be submitted herein, within the context of the other related steps.

Size Separation Step (111)

Subsequently to this first milling step 120, this process preferably comprises at least a step of size separation 111 of the bauxite residue to obtain a gross portion Gr and a fine portion Fi of residue. Said size separation 111 can be performed, for instance, through one or more cyclonic separators.

More preferably, the size separation 111 is performed by two cyclonic separators in series, as shown in the FIG. 2A. A first cyclonic separator SC1 receives the bauxite residue RB from the first milling step 120, and separates it in portions of material with size lower and higher than #100 (−#100 and +#100, respectively), then forwarding the portion of material lower than #100 to a second cyclonic separator SC2, that separates the portion received into portions higher and lower than #200 (−#200 and +#200, respectively). The portion higher than #100, separated by the first cyclonic separator SC1, is added to the portion higher than #200, separated by the second cyclonic separator SC2,

TABLE 1

| phases of bauxite residue as it starts being heated by the microwave reactor. | | | | | | | | |
|---|---|---|---|---|---|---|---|---|
| Time (min.) | Hematite | Goethite | Sodalite | Gibbsite | Usingit | Nepheline | Magnetite | Iron |
| 0 | 38.36 | 21.38 | 15.69 | 1.98 | 16.15 | 0 | 0 | 0 |
| 1 | 43.1 | 19.45 | 17.21 | 0 | 18.37 | 0 | 0 | 0 |
| 2 | 35.74 | 14.76 | 16.32 | 0 | 9.74 | 0 | 0.26 | 0 |
| 3 | 35.27 | 11.41 | 16.17 | 0 | 13.18 | 0 | 9.6 | 0.6 |
| 4 | 44.21 | 2.64 | 10.27 | 0 | 14.85 | 5.13 | 21.79 | 1.12 |
| 5 | 27.01 | 11.11 | 14.09 | 0 | 0.47 | 13.95 | 27.91 | 4.7 |
| 6 | 1.31 | 12.06 | 15.97 | 0 | 0.97 | 18.78 | 45.12 | 5.74 |
| 7 | 0.53 | 11.67 | 12.11 | 0 | 0 | 28.51 | 39.96 | 7.22 |
| 8 | 0.56 | 11.29 | 2.57 | 0 | 0 | 29.69 | 42.66 | 13.23 |
| 9 | 0.85 | 12.47 | 2.27 | 0 | 0 | 35.99 | 39.04 | 9.38 |
| 10 | 0 | 3.68 | 0 | 0 | 0 | 33.03 | 27.99 | 11.34 |
| 11 | 1.25 | 7.91 | 0 | 0 | 0 | 43.18 | 34.61 | 13.05 |
| 12 | 1.29 | 7.91 | 1.78 | 0 | 0 | 46.77 | 30.94 | 12.04 |
| 13 | 0.81 | 0 | 1.53 | 0 | 0 | 39.77 | 30.85 | 11.74 |
| 14 | 2.13 | 3.62 | 0 | 0 | 0 | 58.55 | 25.43 | 9.63 |
| 15 | 1.82 | 7.61 | 0 | 0 | 0 | 45.08 | 32.47 | 13.01 |
| 16 | 1.68 | 5.86 | 2.06 | 0 | 0 | 47.92 | 29.36 | 13.12 |
| 17 | 1.62 | 5.99 | 1.97 | 0 | 0 | 48.85 | 29.28 | 11.77 |
| 18 | 0 | 6.2 | 0 | 0 | 0 | 45.76 | 31.31 | 11.12 |
| 19 | 2.69 | 5.5 | 0 | 0 | 0 | 44.88 | 28.61 | 10.97 |
| 20 | 0 | 5.54 | 0 | 0 | 0 | 49.05 | 30.37 | 13.82 |
| 21 | 5.85 | 1.51 | 0 | 0 | 0 | 54.32 | 26.9 | 11.13 |
| 22 | 1.99 | 0 | 0 | 0 | 0 | 54.34 | 25.79 | 10.18 |

Figure 4:
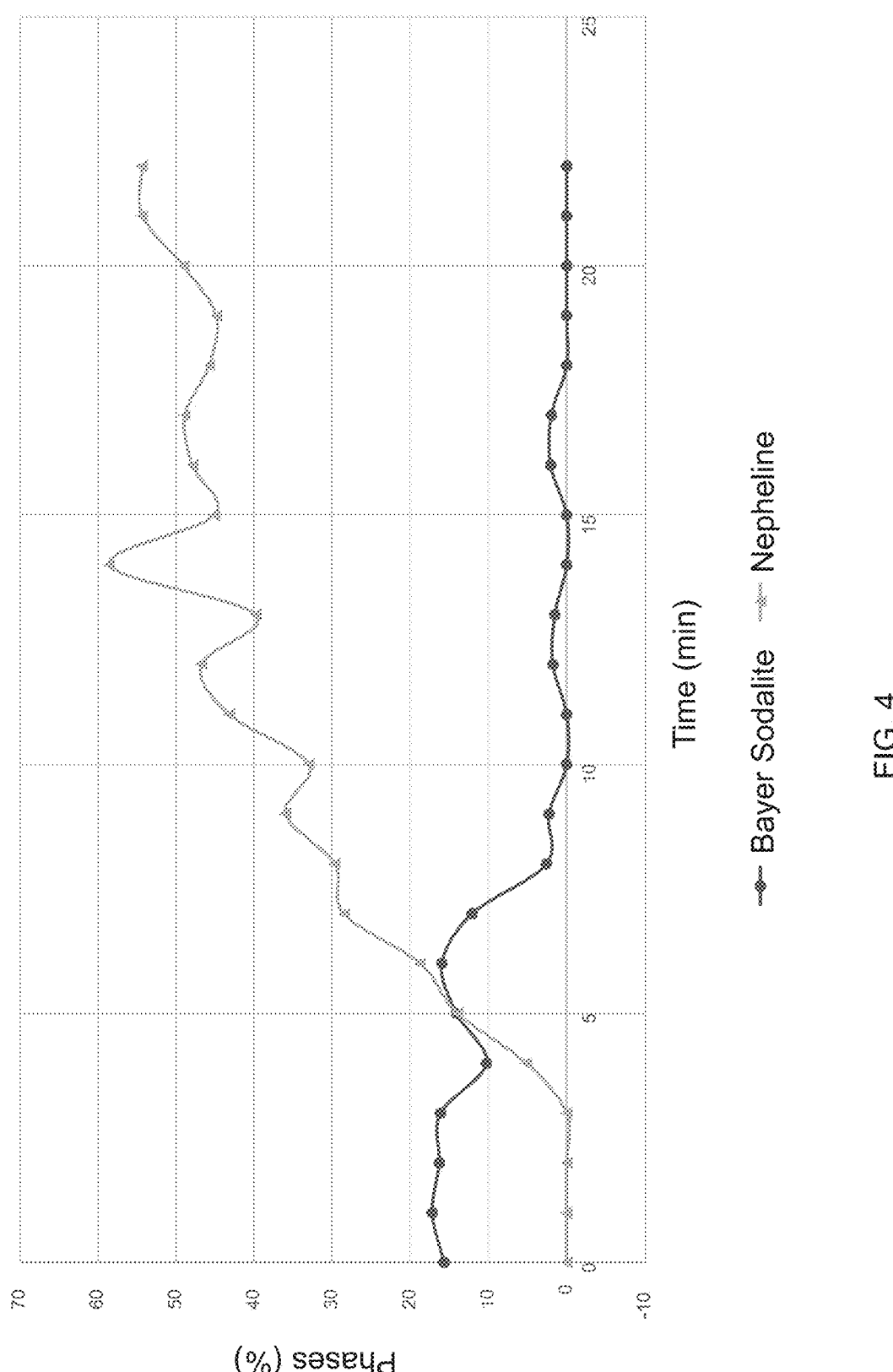
FIG. 4—is a graph showing the conversion of sodalite into nepheline over time, during the recovery process of bauxite residue of this invention.

In this respect, it is still worth emphasizing that, during heating through the microwave, the Sodalite of bauxite residue is transformed into Nepheline, as seen in the FIG. 4. By the end of the conversion, the whole Sodalite is transformed into nepheline. This transformation allows a chemical leaching of this compound, in addition to reducing the basic character of the residue.

First Milling Step (120)

The relevant recovery process of bauxite residue still comprises, in a possible embodiment, the step of at least one milling 120, 121 under the reduced bauxite residue.

More specifically, this process may involve at least one milling step 120, 121 to disaggregate the magnetic phases of and originates the gross portion Gr. The portion lower than #200, separated by the second cyclonic separator SC2, gives rise to the fine portion Fi.

Magnetic Separation Step (130) of the Gross Portion (Gr)

After the size separation 111, the gross portion Gr is directly sent to the magnetic separation step 130, wherein a first magnetic portion Mag. I and a first non-magnetic portion N.Mag I are obtained. Said magnetic separation 130 of the gross portion Gr is preferably performed in a magnetic separator with speed from 300 to 800 RPM and low-intensity magnetic field of approximately 300 Gauss. This first non-magnetic portion N.Mag. I is subsequently combined with a second non-magnetic portion N.Mag. II, as seen below.

Second Milling Step (121)

On its turn, the fine portion F1 of residue undergoes a second milling step 121. In this respect, one notes that the gross portion Gr already contains reduced and released iron, that can be easily concentrated through a mere magnetic separation 130, as proposed above. The fine portion Fi of residue is aggregated to other minerals, so that additional milling is advantageous to release the magnetic particles and to allow a further suitable magnetic separation.

Magnetic Separation Step (131) of the Fine Portion (Fi)

Then, the milled fine portion Fi of residue undergoes an additional magnetic separation step 131, that is intended to separate the fine portion F1 into two other portions, namely an ultrafine non-magnetic portion N.Mag II (preferably above #500) and an ultrafine magnetic portion Mag. II. This step can be performed by a magnetic separator preferably having speed from 900 to 1,100 RPM and magnetic field intensity of approximately 800 Gauss.

Upon magnetic separation, the magnetic portions Mag. I and Mag. II are obtained, so that the metallic iron and the magnetite (being both materials of interest contained in the bauxite residue) can be effectively extracted for further use. As an example, the Table 2 below discloses a ratio between the sizes (fractions) of disaggregated bauxite residue and the content thereof (%), by using the recovery process of bauxite residue as provided by this invention:

TABLE 2

| ratios between fractions and content (%) | | | | |
|---|---|---|---|---|
| Fractions | % Weight | Content (%) | Iron contained | Distribution (%) |
| +100# | 8.3 | 85.71 | 7.11 | 25.79 |
| −100# and + 200# | 8.5 | 78.32 | 6.65 | 24.14 |
| −200# and + 400# | 31.4 | 23.5 | 7.38 | 26.75 |
| −400# and + 600# | 16.5 | 13.1 | 2.16 | 7.84 |
| −600# | 35.3 | 12.1 | 4.27 | 15.49 |
| Total | | | 27.58 | 100.00 |

Table 2 discloses information about the iron contained in each bauxite residue fraction upon treatment in the microwave reactor. The first column shows the granulometric range of iron at Tyler series scale; the second column refers to the percentage in weight retained in each screen; the third column is the iron content as measured in each fraction; the fourth column refers to the iron contained in that fraction, as calculated by the product of percentage of weight, column 2 and content, column 3. The fifth column refers to the iron distribution in each fraction, calculated by dividing the amount of iron contained in the fraction by the total iron.

So, the pyrometallurgical treatment and magnetic separation processes proposed herein allow obtaining magnetic portions Mag. I and Mag. II containing metallic iron and magnetite, that represent a first value-added product extracted according to the process of this invention.

On its turn, the ultrafine non-magnetic portion N. Mag. II is combined to the non-magnetic portion N. Mag. I obtained from the gross portion Gr for obtaining a combined non-magnetic portion N.Mag I+II, that is forwarded to the chemical processing steps to the extraction of other materials of interest, as seen below.

As refers to the chemical processing, the recovery process of derivatives of bauxite residue according to this invention comprises the following steps, that must be performed in the sequence indicated, so as to allow a correct extraction of materials of interest:

(i) leaching 140 the portion of non-magnetic material for obtaining a leaching liquor, and subsequently decanting and filtering said leaching liquor, to the extraction of silica $SiO_2$;

(ii) precipitating 150 the liquor byproduct of leaching 140 for obtaining titanium dioxide $TiO_2$;

(iii) evaporating 160 the liquor byproduct of precipitation 150 for obtaining a saturated liquor and an alumina-rich retained solid; and (iv) calcinating 170 the alumina-rich retained solid obtained from evaporation 160 to obtain alumina.

The above treatment steps are performed to the recovery of specific materials of the non-magnetic portion N.Mag I+II of the residue from sulfuric acid. Further, we shall provide details about each of the above steps.

Leaching Step (140)

Leaching 140 is performed by adding the non-magnetic portion N. Mag I+II to a leaching tank, with addition of sulfuric acid to the tank.

Leaching takes place at a solid-liquid ratio from 1 to 10 grams of non-magnetic portion for 10 mL of solution of sulfuric acid, provided that the concentration may vary from 2 mol/L to 6 mol/L, preferably 4 mol/L. Leaching time can vary from 30 to 120 minutes, preferably from 50 to 75 minutes. Temperature can vary from 30° to 90° C., preferably from 50° to 70° C., with an agitation speed axis from 400 to 600 RPM, preferably from 500 to 550 RPM to avoid dead zones.

In these conditions, the non-magnetic silica, that is inert to sulfuric acid, remains in the solid state; it is possible to decant and filter this element, thus allowing the extraction of amorphous silica $SiO_2$ from the bauxite residue. The leaching liquor arising therefrom, in water phase, is rich and full of aluminum sulfate, titanyl sulfate and sodium sulfate.

Precipitation Step (150)

Upon leaching 140, the aluminum sulfate- and titanyl sulfate-rich and silica-free liquor is hydrolyzed and precipitated 150 in a precipitation tank. For such, a $TiO_2$ seed is added, and the pH of the solution adjusted with sodium hydroxide up to a pH from 1.5 to 2.5, preferably from 1.8 to 2.2, and agitated with a rotor speed from 50 to 200 RPM, preferably from 100 to 150 RPM at a temperature from 10 to 90 degrees, preferably from 30 to 40 degrees for a period ranging from 30 to 120 minutes, preferably from 60 to 80 minutes. This forces the precipitation of titanium dioxide $TiO_2$, that is subsequently extracted from the liquor, for instance, through a filter press and dryer.

Evaporation Step (160)

Evaporation 160 is performed by adding the byproduct of agitation 150 to an evaporator. Said evaporation consists in evaporating the solution of sulfate aluminum-rich liquor up to a density from 10 to 16 degrees Baumé, preferably from 11 to 13 degrees Baumé, for obtaining an alumina-rich retained solid. For such, stoichiometric amounts of sodium sulfate are added to increase the pH to a range from 6 to 12, preferably from 7 to 8 with 50% solution of sodium hydroxide. The aluminum precipitate must be decanted and filtered. The saturated liquor is recirculated to the precipitator.

Calcination Step (170)

Calcination 170 is performed by adding the byproduct of evaporation 160 extracted from the filter press to a calcinatory. The retained solid obtained by evaporation 160 is calcinated at a temperature from 400 to 800 degrees, preferably from 550 to 650° C., for a period ranging from 30 to 120 minutes, preferably from 40 to 70 minutes for obtaining alumina Al2O3.

The calciner can be also used for obtaining Sulfur dioxide SO2 and Sulfur trioxide SO3, that can be extracted during the calciner exhaustion. Said gases can be used to the acid regeneration if this latter is desirable.

So, the recovery process of bauxite residue proposed herein allows obtaining various materials of interest through heating by microwave and subsequent chemical processing steps on an efficient and quick basis. The process follows a sequence of specific steps whose logic ensures the possibility of extracting elements other than only iron and alumina.

In addition to the advantageous speed promoted by the conversion through microwave, the recovery process of bauxite residue proposed herein allows recovery of various materials present in the residue for a suitable processing. The process does not exclusively refer to iron and alumina, but also provides their recovery at advantageous proportion. The table 3 below shows the percentage of global recovery expected for each material by using the recovery process of bauxite residue of this invention:

TABLE 3

| % of global recovery | | |
| --- | --- | --- |
| Compound | Global Recovery (%) | Mass (kg)/ton. R.B. |
| Metallic iron | 68.64 | 115.60 |
| Alumina | 57.09 | 84.76 |
| Silica | 89.95 | 105.27 |
| Titanium | 58.16 | 21.28 |
| Solid residue | — | 183.20 |

Microwave Reactor and Heating Method

Figure 1:
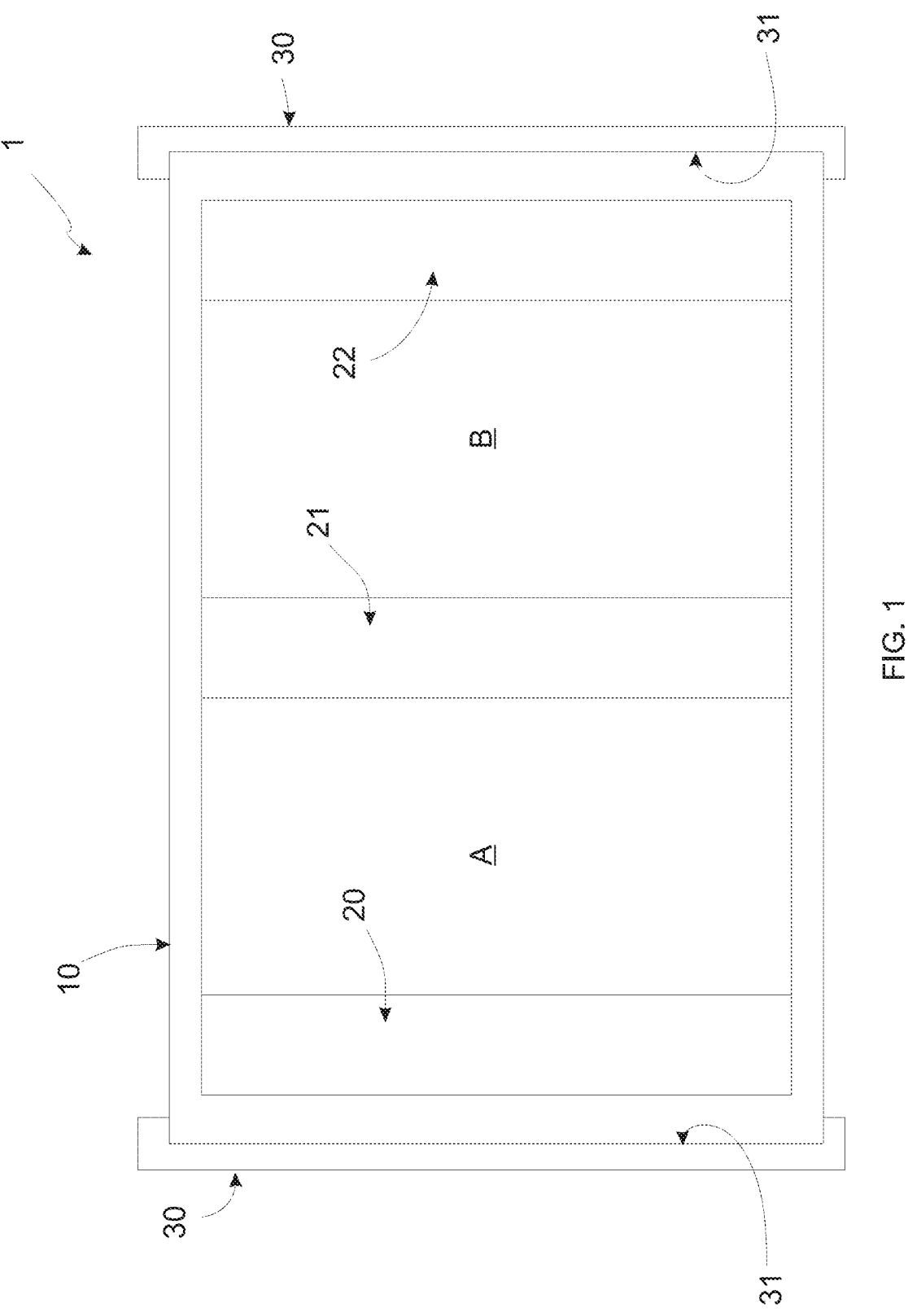
FIG. 1—is a top view of the microwave reactor of this invention, in a preferential embodiment.

In view of the above, FIG. 1 discloses a preferential embodiment of the microwave reactor 1 of this invention. As previously clarified, the recovery process of bauxite residue previously described can use the reactor 1 herein, to reach a particularly advantageous efficiency to the process.

Said reactor 1 comprises a housing 10 composed by thermal insulating material, transparent to microwave. The housing 10 can present any suitable geometry for confinement of the ore product to be heated inside it, including cubic, parallelepiped, or cylindric geometry. The housing 10 can be formed through a set of walls, or a single wall (for instance, in the case of a cylindric geometry).

In a possible embodiment, the housing 10 can be composed by a cell concrete with high alumina content, preferably from 75% to 95% of Al2O3 in the composition, more preferably from 85% and 92% of Al2O3 in the composition and more preferably 92% of Al2O3 in its composition.

Said housing 10 is still preferably composed by low-density cell concrete, preferably from 0.05 to 2 grams per cubic centimeter, more preferably from 0.7 to 1.2 gram per cubic centimeter and more preferably 0.9 gram per cubic centimeter. It shall be made in a process generating bubbles in its structure, so that it remains aerated and keeps a transparent electromagnetic irradiation from microwave even upon heating.

The reactor 1 still comprises, at least, a susceptor wall 20, 21, 22 composed of susceptor material. In a possible embodiment, the reactor 1 comprises several susceptor walls 20, 21, 22 that cover, at least, an internal portion of the housing 10. The susceptor material integrating the susceptor wall must be a material that allows suitable absorption of the electromagnetic waves and converts their energy into heat. The material of susceptor wall 20, 21, 22 must have a high di-electric constant and a high magnetic moment, as well as chemical, thermal and mechanic resistance. In a possible embodiment, the susceptor wall 20, 21, 22 is composed by, at least, one of: silicon carbide, limenite and metallic titanium. The selected material shall preferably allow a maximum heating of mining products within a time as short as possible, being likely to preferably vary from 2 to 18 minutes, with a temperature kept above 80% of the temperature of conversion into magnetic phases for, at least, twice the time spent to reach the temperature of conversion into magnetic phases, more preferably 4-minute irradiation, while keeping heat for 10 minutes, in view of the construction and capacity of the reactor 1. These preferential intervals are applicable to any processes using the microwave reactor to the conversion of any mining products, and particularly applicable to the processes described below (recovery of materials from bauxite residue, ore fines and lateritic nickel).

Preferably, the width of this susceptor wall 20, 21, 22 shall vary from 1 to 10 mm width, more preferably from 3 to 7 mm, being more preferably 5 mm. In this possible embodiment, about 40 to 50% of electromagnetic waves are absorbed by the wall, and the remaining part by a mixture between the residue from Bayer process and the reductor, thus allowing the process to benefit the transferred energy at most.

Preferably, the region limited by the housing 10 and by, at least, one susceptor wall characterizes at least one heating chamber A, B. The embodiment of the heating chamber A, B can be implemented in several forms. For instance, in case of a cylindric embodiment pf the housing 10, and of a ring-shaped embodiment of the susceptor wall 20, a heating chamber shall be configured in the internal region limited both by the housing 10 and by the susceptor wall 20. The example of reactor 1 from the FIG. 1 illustrates an embodiment of two heating chambers A, B through a joint limitation of the housing 10 and of the susceptor walls 20, 21 and 21, 22 to the formation of rectangular chambers A, B. The heating chamber A, B is set to receive and confine the product to be heated in the reactor 1. The size and number of chambers vary according to the heat transfer capacity of the product to be heated, and to the desired hearing flow.

In a possible embodiment, the reactor 1 comprises at least a reflector plate 30 composed of reflector material of electromagnetic waves, such as stainless steel or any other shining reflexive metal, such as aluminum. Preferably, the reflector plate 30 comprises at least a brushed surface 31 turned towards the heating chamber A, B, to allow an efficient reflection of the electromagnetic waves over the chambers A, B and over the susceptor walls 20, 21, 22. More preferably, the reactor 1 comprises a pair of reflector plates, being 30 placed at the opposite longitudinal ends of the housing 10. Still preferably, the reflector plate 30 comprises width from mm to 5 mm, more preferably from 1 to 3 mm, and still more preferably 2 mm.

Of note, the microwave reactor 1 of this invention is particularly efficient for application in heating materials for further recovery of elements of interest from these latter. The reactor 1 proposed herein allows a quick heating of mining products to the conversion/reduction thereof, and subsequent recovery of their elements. Particularly, the microwave reactor of this invention uses a housing 10 with transparent material to electromagnetic waves, thus allowing a quick and homogenous heating of products, without need of specific openings to the entry of waves. The arrangement of the susceptor walls 20, 21, 22 and of the housing 10 to the formation of the chambers A, B allows an efficient heating of products. The optional application of reflector plates 30 still improves such efficiency, thanks to the reflection of the electromagnetic waves towards the chambers A, B and towards the susceptor walls 20, 21, 22.

In according with the above description of the microwave reactor, this invention still provides a heating method of products through microwaves, comprising the step of issuing microwaves over a microwave reactor 1, so that these waves traverse a housing 10 of the microwave reactor 1, composed of thermal insulating material and transparent to microwave 10, and so that said microwaves reach at least a susceptor wall 20. In a possible embodiment, the method can still comprise the step of reflecting the microwaves over a reflector plate 30.

So, this invention still comprises recovery processes of materials derived of mining residues.

Recovery Process—Iron Ore Fines

This invention still contemplates a recovery process of materials from ore fines. Ore fines are iron ores with poor content and low aggregate value, and form the fine fraction derived of mining processes. The fine fraction is usually disposed of, or requires excessive processing; in most cases, it is unlikely to be used in a traditional iron conversion (Blast furnace) without being processed and agglomerated by pelletizing or synthetization, due to its low size and poor composition.

Figure 5:
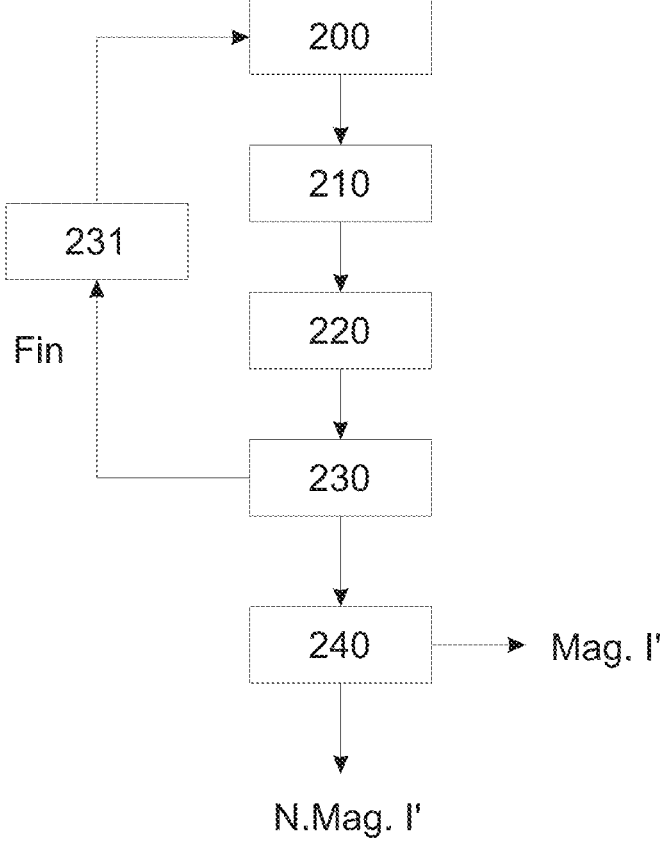
FIG. 5—is a flowchart of the recovery process of derivatives from ore fines, in a preferential embodiment.
Figure 6:
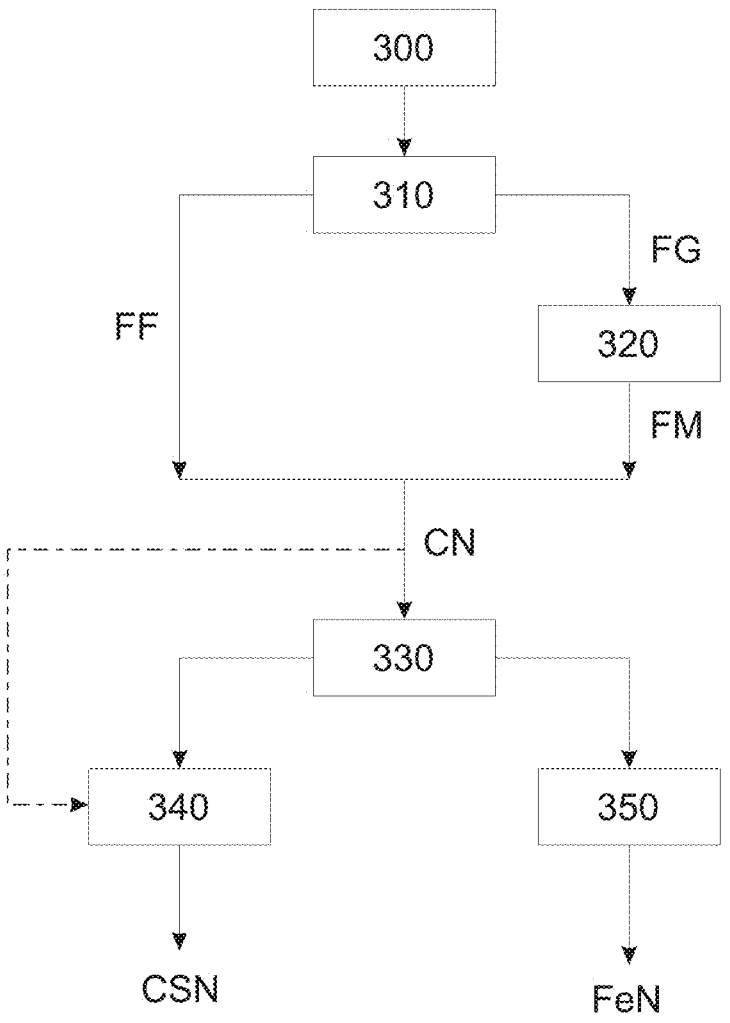
FIG. 6—is a flowchart of the recovery process of derivatives of bauxite residue, in a preferential embodiment.

Therefore, this invention suggests a recovery process of iron ore fines that do not need prior processing or agglomeration, being, instead, able to extract materials of interest from this mining product. A preferential embodiment of this process is illustrated by FIG. 5.

The recovery process of ore fines comprises the step of:

heating 210 the iron ore fines in a microwave reactor for obtaining reduced iron ore fines.

This heating step allows converting the material inside the ore fines without need of prior pelletizing or agglomeration. The conversion takes place in a manner similar to the above description relating to the recovery process of bauxite residue, considering, in this case, the materials contained in the iron ore fines.

In a possible embodiment, this process can still comprise the steps of:

mixing 200 the iron ore fines to fines from a reducing agent to obtain a mixture of fines; and heating 210 the mixture of fines in a microwave reactor 1 to obtain reduced iron ore fines.

The above steps are intended to allow conversion of the materials contained inside the fines during heating. In this case, the reducing agent is also introduced in the form of fines. For instance, the reducing agent can be coal fines. One should reiterate that, in the case of use of coal fines, coal is only used as a reducing agent, rather than as fuel for heating, given that heating is directly performed through the microwaves.

In a possible embodiment, this process can still comprise the steps of:

performing at least one milling step 220 and one magnetic separation step 240 to obtain portions of magnetic material Mag I and of non-magnetic material N. Mag I.

Milling 220 can be performed after heating 210, through a ball mill, and the magnetic separation can be performed by any suitable magnetic separator.

Preferably, the process can still comprise the step of performing, between the milling step 220 and the magnetic separation step 240, at least a size separation step 230. The size separation step 230 can be performed through a cyclone separator. More preferably, the process still comprises the step of returning 231 a fine fraction Fin of iron ore fines obtained from the size separation 230 to the mixture step 200. In this respect, one notes that the fine fraction is re-circulated to allow the complete use of the reductor not burnt during the first passage, as well as the complete use of hematite and magnetite not converted into metallic iron. By using re-circulation in a closed process, the total conversion of fines tends to be close to 100%. The gross fraction, referring to the iron converted into metal, is separated by the cyclone by leaving the bottom of the cyclone, while the non-converted iron fractions, together with the reductor that did not react, leave by the top and return to the reduction stage.

The portion of magnetic material Mag. I extracted from iron ore fines comprises pig iron, and the portion of non-magnetic material N.Mag I comprises elements such as silica, aluminum and coal, that can be used in related processes.

So, the recovery process of derivatives of iron ore fines proposed herein allows the conversion of fines, as well as the extraction of materials of interest in an efficient manner, without need of synthetizing or pelletizing the fines for such.

To illustrate the above statement, the Table 4 below discloses composition tests (major compounds) with different fractions of iron ore fines obtained through the recovery process of this invention, in a condition of 50% hematite and 50% mineral coal:

TABLE 4

| composition of different fractions of ore fines obtained through the process of this invention. | | | |
|---|---|---|---|
| Fraction of Ore fines | Metallic iron (%) | Al (%) | Si (%) |
| +100# | 94.48 | 1.17 | 3.15 |
| −100# and + 200# | 94.80 | 1.09 | 3.35 |
| −200# and + 270# | 94.93 | 1.08 | 3.17 |
| −270# and + 600# | 46.79 | 1.25 | 3.29 |
| −600# | 14.24 | 0.57 | 1.47 |

As can be seen in the Table 4, that discloses the result from reduction in microwaves, milling, and sieving in screens at the Tyler scale, a first reduction step in microwaves produces metallic iron with commercial purity in fractions above #270. The fraction below #270 shall be re-circulated by a current on the top of to cyclone to increase its content and size, while the remaining material contained in the fractions below #270 refers to the reductor non-converted in this first step, that shall be also re-circulated to improve the process efficiency.

Recovery Process—Lateritic Nickel

This invention also contemplates a recovery process of materials derived of lateritic nickel, that is the cladding fraction of nickel deposit. This fraction is not currently used by the nickel and iron-nickel refineries, because the content is inappropriate to melting processes in conventional ovens and leaching under pressure and temperature. Currently, the mining companies store this fraction while waiting for a processing technology for iron-nickel enrichment and subsequent use. The deposits are spread in several sites worldwide, particularly in the intertropical geographic zone, and the biggest deposits in Brazil and in the World have great amounts of lateritic nickel. Therefore, it is clearly relevant to reach a process that allows the recovery of materials of interest from this mining product.

This invention suggests a recovery process of derivatives of lateritic nickel, that uses specific steps for obtaining an iron-nickel concentrate and subsequent steps to allow the treatment of this concentrate to allow recovery of materials of interest.

This process comprises the steps of:

scrubbing 300 the lateritic nickel to obtain disagglomerated lateritic nickel;

performing size separation 310 of the disagglomerated lateritic nickel in, at least, a fine fraction FF and at least a gross fraction FG; and magnetically separating 320 the gross fraction FG to obtain a magnetic fraction FM.

The scrub step 300 intends to physically benefit the lateritic nickel to undo the iron-nickel agglomerates from this mining product. The subsequent size separation step allows obtaining fine FF and gross FG fractions of lateritic nickel. The scrub step 300 can be performed, for instance, inside an intensive scrub trommel, while the size separation step 310 can be performed by a cyclone separator.

A scrub step 300 as proposed by this process was found to allow the enrichment of nickel content inside the fine fraction of lateritic nickel. As examples, the Tables 5 to 8 below show a comparative between the increase in scrub time and the nickel content in the fine fraction obtained:

TABLE 5

| Scrubber Nickel 0.5% Ni 5 minutes | | | | |
| Fraction | Weight (%) | Ni (%) | Ni Contained | Nickel distribution (%) |
| --- | --- | --- | --- | --- |
| +635# | 58.22 | 1.1 | 0.2 | 39.25 |
| −635# | 41.78 | 0.72 | 0.3 | 60.75 |

| Scrubber 0.5% Ni 20 minutes | | | | |
| Fraction | Weight (%) | Ni (%) | Ni Contained | Nickel distribution (%) |
| --- | --- | --- | --- | --- |
| +635# | 54.17 | 0.29 | 0.16 | 32.55 |
| −635# | 45.83 | 0.72 | 0.33 | 67.45 |

TABLE 6

| Scrubber Nickel 1.2% Ni 5 minutes | | | | |
| Fraction | Weight (%) | Ni (%) | Ni Contained | Nickel distribution (%) |
| --- | --- | --- | --- | --- |
| +635# | 42.52 | 2.74 | 0.35 | 28.77 |
| −635# | 57.48 | 1.53 | 0.88 | 71.23 |

TABLE 6-continued

| Scrubber 1.2% Ni 20 minutes | | | | |
| Fraction | Weight (%) | Ni (%) | Ni Contained | Nickel distribution (%) |
| --- | --- | --- | --- | --- |
| +635# | 37.85 | 0.78 | 0.29 | 23.62 |
| −635# | 62.15 | 1.53 | 0.95 | 76.38 |

TABLE 7

| Scrubber Nickel 0.9% Ni 5 minutes | | | | |
| Fraction | Weight (%) | Ni (%) | Ni Contained | Nickel distribution (%) |
| --- | --- | --- | --- | --- |
| +635# | 40.02 | 1.96 | 0.23 | 26.83 |
| −635# | 59.98 | 1.1 | 0.66 | 73.17 |
| +635# | 28.53 | 0.53 | 0.15 | 16.78 |
| −635# | 71.47 | 1.05 | 0.75 | 83.22 |

TABLE 8

| Nickel 1.4% Ni 5 minutes Scrubber | | | | |
| Fraction | Weight (%) | Ni (%) | Ni Contained | Nickel distribution (%) |
| --- | --- | --- | --- | --- |
| +635# | 37.1 | 3.26 | 0.38 | 24.62 |
| −635# | 62.9 | 1.86 | 1.17 | 75.37 |

| Scrubber 1.4% Ni 20 minutes | | | | |
| Fraction | Weight (%) | Ni (%) | Ni Contained | Nickel distribution (%) |
| --- | --- | --- | --- | --- |
| +635# | 31.52 | 1.01 | 0.32 | 19.49 |
| −635# | 68.48 | 1.92 | 1.31 | 80.51 |

Tables 5 to 8—comparative studies between the increase in scrub time (5 min., 20 min) and the nickel content in the fine fraction obtained.

The four samples that were subject to the scrubber, both with lateritic profile and contents of 0.5% Nickel, 0.9% Nickel, 1.2% Nickel and 1.4% Nickel, referred to in the Table 5 as 0.5% Ni, 0.9% Ni, 1.2% Ni and 1.4% Ni respectively, presented increased contents during the time of exposure to intensive attrition by scrubber. Scrubbing leads nickel agglomerates to recover particles and allows other particles encapsuled by the fine nickel to be released and concentrated in the fine fraction. As shown by the nickel distribution, all the tested fractions presented an increase in the fine fraction through the time of exposure to scrubber.

Moreover, the table 6 below shows the composition of lateritic nickel after 20-minute scrub in the fine fraction, where a considerable concentration of iron and nickel can be observed:

TABLE 6

| composition of lateritic nickel after 20-minute scrub | | | | | | |
| Fraction | Olivine (%) | Goethite (%) | Cochromite (%) | Lizardite (%) | Magnetite (%) | Pyroxene (%) |
| --- | --- | --- | --- | --- | --- | --- |
| 0.5% Ni R.O.M. | 21.96 | 40.92 | 1.17 | 14.77 | 4.64 | 16.54 |
| 0.5% Ni Scrubber Fines | 12.44 | 68.39 | 0.76 | 15.60 | 1.61 | 1.20 |
| 0.9% Ni R.O.M. | 9.83 | 63.55 | 0.67 | 12.36 | 2.87 | 10.72 |
| 0.9% Ni Scrubber Fines | 5.08 | 80.28 | 0.94 | 10.36 | 2.51 | 0.80 |

TABLE 6-continued

| | composition of lateritic nickel after 20-minute scrub | | | | | |
|---|---|---|---|---|---|---|
| Fraction | Olivine (%) | Goethite (%) | Cochromite (%) | Lizardite (%) | Magnetite (%) | Pyroxene (%) |
| 1.2% Ni R.O.M. | 10.99 | 56.67 | 0.96 | 20.84 | 3.55 | 6.99 |
| 1.2% Ni Scrubber Fines | 5.43 | 74.06 | 1.04 | 17.89 | 0.99 | 0.58 |
| 1.4% Ni R.O.M. | 10.19 | 55.81 | 1.43 | 19.78 | 6.54 | 5.99 |
| 1.4% Ni Scrubber Fines | 5.59 | 71.16 | 1.01 | 19.93 | 1.31 | 1.00 |

The gross fraction FG obtained in the size separation step 310 is then magnetically separated 320 for obtaining a magnetic fraction FM. The non-magnetic fraction is deemed to be a tailing.

In a possible embodiment, this process still comprises a step of combining the magnetic fraction FM with the fine fraction FF for obtaining an iron-nickel concentrate CN. The fine fraction FF is not processed through magnetic separation, as it has sufficient iron and nickel content.

From this point, the process of the invention can follow two different possible paths, namely: (i) leaching the CN concentrate to obtain a first range of materials of interest, or (ii) treatment of the CN concentrate to obtain iron-nickel.

In both possibilities (i) and (ii) above, the process can still comprise heating 330 of the iron-nickel concentrate CN in a microwave reactor 1 for obtaining a reduced concentrate. The microwave reactor 1 can be as described herein, or any other appropriate to heat mining products. If the possibility (i) of leaching the concentrate CN is selected, one should emphasize that leaching can be assisted or not by heating 330 through microwaves.

If one opts for leaching (i), in a possible embodiment, this process still comprises the step of:

leaching 340 the iron-nickel concentrate CN to obtain, at least, a derivate material CSN.

The derivative obtained through the leaching process is, for instance, a concentrate of nickel sulfate and battery cobalt CSN. Leaching 340 can be followed, for instance, by processing in filter press for obtaining derivatives of interest.

In the case of option for the treatment (ii) for obtaining iron-nickel, in a possible embodiment, the process still comprises the steps of:

milling 350 and magnetically separating 360 the iron-nickel concentrate CN to obtain, at least, a derivative FeN.

The derivative obtained by these additional steps is the iron-nickel FeN. Milling 350 can be performed through a ball mill, and the magnetic separation 360 through any suitable magnetic separator.

Therefore, the recovery process of lateritic nickel derivatives allows obtaining materials of interest from this mining product, through a sequence of steps that allow obtaining an iron-nickel concentrate for subsequent extraction of derivatives through further processing, according to the desired material of interest.

It is worth emphasizing that the recovery process of lateritic nickel derivatives proposed herein can be employed in all the lateritic zone, since the red limonite, through the yellow limonite up to the early saprolite. In certain cases, the intensive scrub step can be replaced or supplemented by milling (for instance, whenever one works with saprolite).

Upon description of one example of preferential embodiment, it must be understood that the scope of this invention encompasses other possible variations, being only limited by the content of the enclosed claims, including any possible equivalents.

The invention claimed is:

1. Method for recovering materials derived from bauxite residue, the method comprising the steps of:
mixing (100) the bauxite residue with a reducing agent to obtain a residue mixture;
heating (110) the residue mixture in a microwave reactor (1) to obtain a reduced bauxite residue;
performing a first milling iteration (120) on the reduced bauxite residue;
performing a size separation (111) of the bauxite residue after the first milling iteration (120) to obtain a coarse portion (Gr) and a fine portion (Fi) of residue;
performing magnetic separation (130) on the coarse portion (Gr) of residue to obtain a first magnetic portion (Mag. I) and a first non-magnetic portion (N. Mag. I);
performing a second milling iteration (121) on the fine portion (Fi) of residue;
performing magnetic separation (131) on the fine portion (Fi) of ground residue to obtain a second magnetic portion (Mag. II) and a second non-magnetic portion (N. Mag II);
leaching (140), with sulfuric acid, the portion of non-magnetic material (N.Man I+II) obtained to obtain silica ($SiO_2$);
stirring (150) a leaching by-product of the leaching (140) with the addition of caustic soda to obtain titanium dioxide ($TiO_2$);
evaporating (160) an agitation by-product of the stirring (150) to obtain effluent (ETE); and
calcinating (170) an evaporation by-product of the evaporating (160) to obtain Alumina ($Al_2O_3$).

2. The method of claim 1, further comprising a step of pelletizing (101) the residue mixture.

* * * * *